June 21, 1932.  H. H. INGERSOLL  1,863,795

MOTOR

Filed Jan. 22, 1932

Witness
Arthur M. Franke.

Inventor
Homer H. Ingersoll.
by Rummler, Rummler & Woodworth
his Attys.

Patented June 21, 1932

1,863,795

UNITED STATES PATENT OFFICE

HOMER H. INGERSOLL, OF CHICAGO, ILLINOIS, ASSIGNOR TO WILLIAMSON MANUFACTURING COMPANY, OF CHICAGO, ILLINOIS, A CORPORATION OF ILLINOIS

MOTOR

Application filed January 22, 1932. Serial No. 588,152.

This invention relates to improvements in electro-magnetic motors wherein the oscillatory motion of the armature of an electromagnet is utilized to impart unidirectional rotation to a rotative element, and particularly to rotating advertising and display devices wherein such motors are employed for the motive power.

A slow speed electric motor in which the speed of rotation can be readily varied to suit different requirements has long been sought to provide silent motive power for such devices as advertising display apparatus, slow moving turntables and the like, wherein it has usually been necessary to resort to costly geared speed reducers or bulky belt and pulley arrangements. Several devices intended to fill this need have been heretofore proposed, but these have generally been of the ratchet and gear type which is inherently noisy and lacks variable speed regulation. Furthermore the success or failure of such a device hinges directly upon simplicity of construction and a resultant low cost of manufacture, and it is this feature that is an outstanding characteristic of the herein described invention.

The main objects of this invention are to provide an improved electro-magnetic motor in which the motive power is derived solely from successive impingements of the curved flexible striker arm upon a peripheral friction surface of a rotor; to provide such a motor with a vibratory actuating member having a curled impact head that will flex upon impingement to impart a peripheral driving impulse to the rotor; to provide such a motor wherein the speed of the rotor can be varied through control of the flexing action of the curled impact element; to provide a gearless electrically driven rotor suitable for use as an advertising or display device having a variable speed turntable; and to provide such an advertising or display turntable driven by a relatively silent vibratory actuating element.

A specific embodiment of this invention as applied to a display stand is shown in the accompanying drawing, in which.

Figure 1:
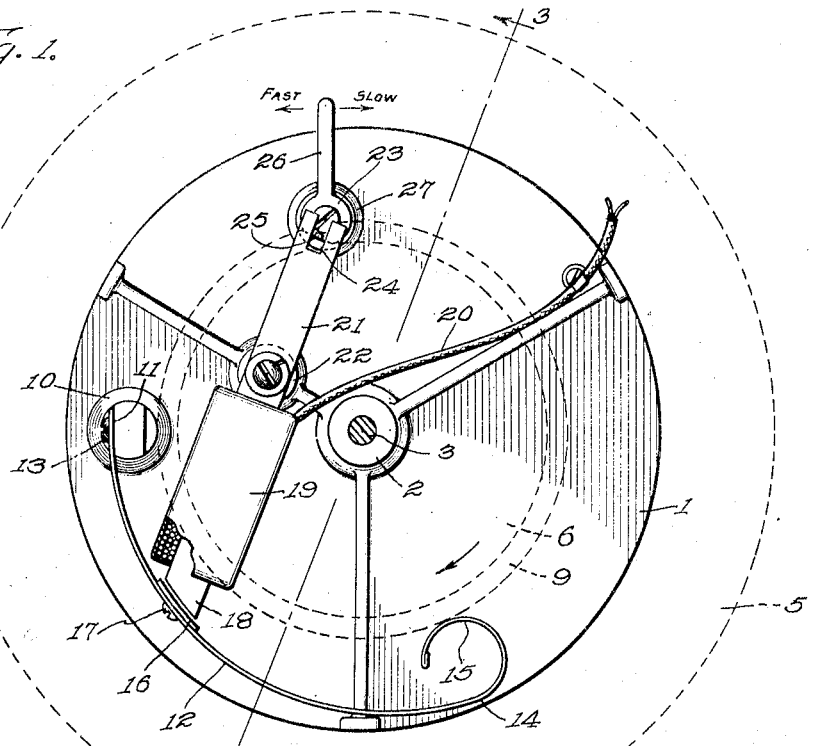
Figure 1 is a plan view of a rotary display device with the turntable and driving ring removed to show the actuating mechanism.
Figure 2:
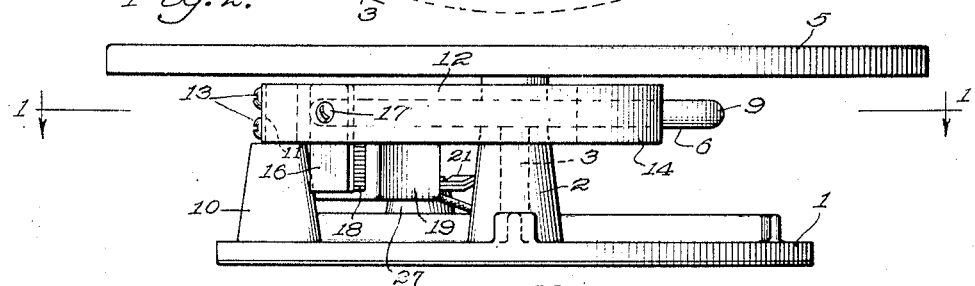
Fig. 2 is a side view of a complete assembly of the same.
Figure 3:
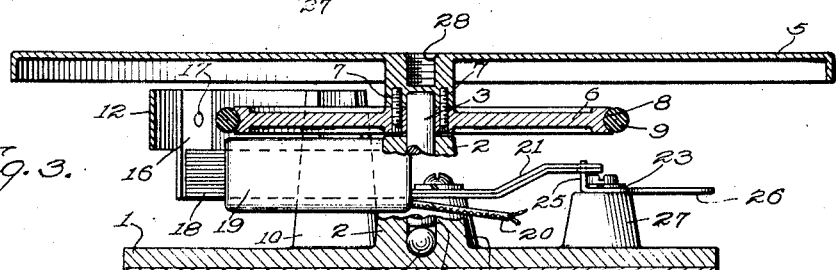
Fig. 3 is a sectional view of the assembled device as taken on line 3—3 of Fig. 1.

In the form shown in the drawing the supporting base, or frame 1, has a centrally disposed vertically projecting journal or shaft support 2, in which a shaft 3 is rotatably carried upon a ball thrust bearing 4. The upper end of the shaft 3 supports a disk-like turntable 5 which carries a driving wheel or rotor 6 concentrically secured to its inner or bottom side by means of the bolts 7. The rotor or driving ring 6 is provided with a peripheral groove 8 in which is seated a ring 9 to provide a peripheral friction surface. As shown in the drawing the ring 9 is in the form of a solid tire having a circular cross section and is preferably made of rubber to absorb the shock of the vibratory driving impulse and permit silent operation of the motor.

The frame 1 is also provided with a second vertically projecting part or support 10, positioned so as to be outside of the peripheral limits of the driving ring 6 and the tire 9. The upper end of the support 10 is provided with a flat surface 11 upon which one end of a cantilevered resilient actuating member or arm 12 is secured by means of bolts 13, the actuating member 12 being positioned in and parallel with the plane of rotation of the driving ring or rotor 6.

In the form shown, the actuating member 12 extends somewhat tangential to the periphery of the driving ring 6 and terminates in a free end 14 positioned adjacent the tire 9. The actuating member 12 is preferably in the form of a curved flat spring and the free end 14 is curled inwardly toward the periphery of the ring 6 and back upon itself to form a flexible impact head 15 which contacts tangentially with the peripherial friction surface of the tire 9.

At a point intermediate the free and fixed ends of the resilient actuating member 12, an armature 16 is secured to the actuating member by means of a bolt 17.

The armature 16 is preferably positioned near the fixed end of the actuating member 12 and extends out of the plane of the rotor into position to be influenced by the core 18 of an electro-magnet having a coil 19 and electric leads 20. The coil 19 is mounted on one end of a bar 21 which is pivotally secured to a vertical support 22 on the base 1 so as to be swingable in a plane parallel to the plane of rotation of the driving ring or rotor 6. The bar 21 is pivoted at approximately its center and extends beyond that point to engage a cam 23 which has a finger 25 extending into a longitudinal slot 24 at the end of the bar. The cam 23 also has a radially extending arm 26, by which it is manually adjusted, and is pivoted on a support 27 which is an integral part of the base 1.

In operation the coil 19, which in the form shown is of the alternating current electro-magnetic type, is energized through the electric leads 20 which furnish a suitable alternating current and tends to rapidly vibrate the resilient actuating member 12 through alternate repelling and attracting of the armature 16.

The rapid vibration of the actuating arm 12 causes successive impingement of the curled impact element 15 upon the peripheral friction surface of the tire 9, which is mounted on the periphery of the driving ring 6. When the flexible impact member 15 strikes the peripheral surface of the tire 9, it tends to contractedly curl inwardly upon itself and perform a manner of rolling which imparts a peripheral driving impulse to the friction surface of the tire 9, thereby causing the driving ring 6 to move in the direction of the arrow on Fig. 1.

The impinging action of the impact element 15 upon the tire 9 is caused by the armature 16 being attracted toward the core 18 and the electro-magnet 19, and due to the oscillating characteristics of the alternating current furnished to the coil the armature 16 is repelled so as to pull the impact head 15 away from the peripheral surface of the tire 9 before the impact head is able to uncurl itself to oppose rotation of the driving ring 6 in its original direction. Therefore through rapid and successive rythmic impingements, and the resultant flexing of the impact head 15 upon the peripheral surface of the tire 9, the driving ring 6 is caused to continuously travel in one direction and thereby impart a unidirectional rotation to the disk 5 to which the driving ring is attached.

Due to the mounting of the electro-magnet 19 the same can be adjusted toward or away from the armature 16, and thereby regulate the amplitude of vibration of arm 12 and thus control the speed of rotation of the rotor.

A novel characteristic of this invention is the manner with which the peripheral driving impulse is imparted to the driving ring or rotor, which action is obtained through the flexing or rolling movement of the free end of an actuating member which is rapidly and successively impinged on the peripheral surface of the rotor.

With this manner of driving the rotor a positive unidirectional rotation is imparted, the speed of which can be readily increased or decreased. Furthermore the action of the device is practically silent.

A distinctive advantage of this invention lies in its application to display advertising devices wherein a low cost, slow, variable speed turntable is desired. In the form shown in the drawing the herein described motor is embodied in such a turntable advertising device that is suitable for displaying merchandise so as to show views of the same from all sides.

The turntable is also shown provided with an internally threaded socket 28 in which a vertical shaft or support can be inserted to carry additional turntable disks or to support hanging objects that are to be displayed.

Although but one specific embodiment of this invention is herein shown and described, it is to be understood that details of the construction shown may be altered or omitted without departing from the spirit of this invention as defined by the following claims.

I claim:

1. The method of imparting unidirectional motion to a rotative element having a peripheral friction surface which consists in rapidly and successively striking said friction surface with the curled end of a spring element in such a manner that said curled end will impinge upon said friction surface and flex so as to impart a peripheral driving impulse to said rotative element.

2. The method of imparting unidirectional motion to a rotative element having a peripheral friction surface which consists in rapidly and successively striking said friction surface with the curved end of a spring element in such a manner that the impinging of said curved end upon said friction surface will cause said spring element to flex and roll said curved end and thereby impart a peripheral driving impulse to said rotative element.

3. The method of imparting unidirectional motion to a rotative element having a peripheral friction surface which consists in rapidly and successively striking said friction surface with the curled end of a spring element in such a manner that said curled end will impinge upon said friction surface and flex in an angular direction relative to the motion of said spring end prior to impact with said friction surface.

4. The method of imparting unidirectional motion to a rotative element having a peripheral friction surface which consists in rapidly and successively impinging the curled end of a spring element upon said friction surface in a manner causing said curled end to coil contractedly and impart a peripheral driving impulse to said rotative element.

5. A motor comprising a rotary element having a peripheral friction surface, a cantilever spring element having the fixed end secured to a stationary support and the free end disposed in the plane of said rotary element adjacent the periphery thereof, a curled flexible portion at the free end of said spring element curved in the plane of said rotary element, and means to vibrate said spring element to cause successive impinging of said curled portion upon said peripheral friction surface.

6. A motor comprising a rotary element having a peripheral friction surface, a resilient actuating element having one end secured to a fixed support and a free end disposed in the plane of said rotary element adjacent the peripheral surface thereof, a curved impact member on said free end mounted to roll on said peripheral surface when impinged thereupon, and means for vibrating said actuating element to cause said impact member to impinge upon said friction surface and impart a peripheral driving impulse to said rotary element.

7. A motor comprising a rotary element having a peripheral friction surface, driving means comprising a vibrative actuating element having a fixed end and a resilient impact end, said impact end being disposed adjacent said peripheral surface and being curled in a plane parallel to the plane of rotation of said rotary element, and means to impart vibratory motion to said actuating element to cause successive impingement of said impact end upon said peripheral surface, said resilient curled impact end flexing when impinged upon said peripheral surface to impart a peripheral driving impulse thereto.

8. A motor comprising a supporting frame having a rotatable shaft journaled thereon and a rotative element on said shaft, a peripheral friction surface on said rotative element, a resilient actuating member secured to said supporting frame and having a free end disposed adjacent the periphery of said rotative element, a flexible impact member on said free end curled in the plane of rotation of said rotative element and toward said friction surface, and an electro-magnetic coil on said base frame adapted to vibrate said actuating member to cause successive impingement of said impact member upon said friction surface, said impact member flexing when impinged upon said friction surface to impart a peripheral driving impulse to said rotative element.

9. An electro-magnetic motor comprising a rotor having a peripheral friction surface, a resilient actuating member fixed at one end and positioned parallel to the plane of rotation of said rotor, said actuating member having a free end disposed adjacent the periphery of said rotor, a flexible curled impact element on said free end, an armature on said actuating member positioned intermediate the fixed and free ends thereof, and electro-magnetic means arranged adjacent said armature to attract and repel the same alternately and cause rapid vibration of said actuating member to impinge said impact element successively upon said friction surface, said impact element flexing when impinged upon said friction surface to impart a peripheral driving impulse thereto.

10. An electro-magnetic motor comprising a rotor having a peripheral friction surface, an actuating member having a free end disposed adjacent said peripheral surface, a flexible curled impact element on said free end curled in the plane of rotation of said rotor, electro-magnetic means to vibrate said actuating member against said friction surface, said impact element flexing to impart a peripheral driving impulse thereto, and means controlling the flexing action of said impact element to vary the speed of rotation of said rotor.

11. An electro-magnetic motor comprising a rotor having a peripheral friction surface, an actuating member mounted on a fixed support and having a free end disposed adjacent said peripheral surface, a flexible impact element on said free end curled in the plane of rotation of said rotor and toward said friction surface, an armature in said actuating member, electro-magnetic means to repel and attract said armature alternately to vibrate said actuating member and cause successive impingements of said impact element upon said friction surface, said impact element flexing to impart a peripheral driving impulse thereto, and means to adjust said electro-magnetic means toward and away from said armature to vary the speed of rotation of said rotor.

12. A motor comprising a supporting frame, a rotor journaled on said frame and having a peripheral friction surface, an actuating member mounted to oscillate in the plane of rotation of said rotor, a flexible impact element on said free end curled inwardly toward said friction surface, an armature on said actuating member, an electro-magnet pivotally mounted on said frame eccentrically relative to said rotor and adjacent said armature to vibrate said actuating member and cause successive impingements of said impact element upon said friction surface, said impact element flexing when impinged upon said friction surface to impart a peripheral driving impulse thereto, and means to adjust said electro-magnet pivotally toward and away from said armature to vary the impinging force of said impact element and the extent of flexing thereof to vary the speed of rotation of said rotor.

13. A display device comprising a supporting base, a turntable journaled on said base and disposed parallel thereto, a driving member concentrically secured to said turntable and having a peripheral friction surface, an actuating member secured on said base in the plane of said driving member, said actuating member having a free end disposed adjacent said peripheral friction surface, a flexible impact element on said free end, electro-magnetic means to vibrate said actuating member and cause successive impingements of said impact element upon said friction surface, said impact element flexing when impinged upon said friction surface to impart a peripheral driving impulse thereto and rotate said turntable, and means controlling the flexing action of said impact element comprising means for adjusting the electro-magnetic means to vary the speed of rotation of said turntable.

14. A display device comprising a supporting base, a turntable journaled on said base to rotate parallel thereto and having a centrally disposed socket opening on its outer side, a driving member concentrically secured to said turntable on its inner side and having a peripheral friction surface, an actuating member secured on said base parallel to the plane of said driving member and having a free end disposed adjacent said peripheral friction surface, a flexible impact element on said free end, an adjustable electro-magnet on said base arranged to vibrate said actuating member and cause successive impingements of said impact element upon said friction surface, said impact element flexing when impinged upon said friction surface to impart a peripheral driving impulse thereto and rotate said turntable.

15. A display device comprising a supporting base, a turntable journaled on said base and disposed to rotate parallel thereto, a driving member concentrically secured to said turntable and having a peripheral friction surface, an actuating member secured on said base parallel to the plane of said driving member and having a free end disposed adjacent said peripheral friction surface, a flexible curled impact element on said free end, a bar pivotally secured to said base, an electro-magnet on said bar positioned to vibrate said actuating member and cause successive impingements of said impact element upon said friction surface, said impact element flexing when impinged upon said friction surface to impart a peripheral driving impulse thereto and rotate said driving member, and means coacting with said bar to swing said bar on its pivot and move said electro-magnet to vary the impinging force of said impact element and the extent of flexing thereof.

Signed at Chicago, in the county of Cook and State of Illinois, this 2d day of January, 1932.

HOMER H. INGERSOLL.